United States Patent
Baginski

[19]

[11] Patent Number: 5,941,483
[45] Date of Patent: Aug. 24, 1999

[54] SERVICE LINE CLAMP WITH CABLE TIE MOUNT

[75] Inventor: Frank T. Baginski, Kernersville, N.C.

[73] Assignee: Volvo Trucks North America, Inc., Greensboro, N.C.

[21] Appl. No.: 09/066,746

[22] Filed: Apr. 24, 1998

[51] Int. Cl.$^6$ .................................................. F16L 3/22
[52] U.S. Cl. .................. 248/68.1; 248/74.4; 411/396; 411/431; 411/999
[58] Field of Search .................. 248/68.1, 49, 74.4; 411/431, 377, 396, 970, 999

[56] References Cited

U.S. PATENT DOCUMENTS

| | | |
|---|---|---|
| T100,605 | 5/1981 | Christian .............................. 248/68.1 |
| 1,192,593 | 7/1916 | Wolff . |
| 1,893,166 | 1/1933 | Fox . |
| 2,354,919 | 8/1944 | Lockwood . |
| 2,355,742 | 8/1944 | Morehouse ............................ 248/68.1 |
| 2,356,318 | 8/1944 | Hayman . |
| 2,361,943 | 11/1944 | Issoglio et al. . |
| 2,362,124 | 11/1944 | Ellinwood ......................... 248/68.1 X |
| 2,404,531 | 7/1946 | Robertson ............................ 248/68.1 |
| 2,417,260 | 3/1947 | Morehouse ....................... 248/68.1 X |
| 2,425,935 | 8/1947 | Hayman . |
| 2,596,020 | 5/1952 | Fletcher et al. . |
| 2,695,046 | 11/1954 | Tinnerman, III .................... 411/970 X |
| 2,704,680 | 3/1955 | Bedford, Jr. ........................ 411/970 X |
| 2,712,167 | 7/1955 | Blanchard . |
| 2,937,835 | 5/1960 | Csmereka . |
| 2,963,539 | 12/1960 | Hynes . |
| 3,023,989 | 3/1962 | White . |
| 3,087,009 | 4/1963 | Blanchet . |
| 3,099,056 | 7/1963 | Hurcomb . |
| 3,146,982 | 9/1964 | Budnick . |
| 3,397,431 | 8/1968 | Walker . |
| 3,414,220 | 12/1968 | Walker . |
| 3,486,725 | 12/1969 | Hidassy . |
| 3,682,422 | 8/1972 | Evans .................................... 248/68.1 |
| 3,843,083 | 10/1974 | Angibaud . |
| 3,856,244 | 12/1974 | Menshen .............................. 248/68.1 |
| 3,860,978 | 1/1975 | Wirth . |
| 3,894,706 | 7/1975 | Mizusawa ............................ 248/68.1 |
| 3,982,304 | 9/1976 | Menshen ........................... 248/68.1 X |
| 4,030,540 | 6/1977 | Roma . |
| 4,131,257 | 12/1978 | Sterling . |
| 4,224,721 | 9/1980 | Ohlson . |
| 4,270,250 | 6/1981 | Schön . |
| 4,273,465 | 6/1981 | Schoen . |
| 4,358,080 | 11/1982 | Wolker ................................. 248/68.1 |
| 4,372,510 | 2/1983 | Skypala . |
| 4,444,370 | 4/1984 | Krueger . |
| 4,450,605 | 5/1984 | Schäty . |
| 4,467,988 | 8/1984 | Kraus ................................... 248/68.1 |
| 4,541,602 | 9/1985 | Potzas .............................. 248/68.1 X |
| 4,572,302 | 2/1986 | Frisbee . |
| 4,597,690 | 7/1986 | Girard . |
| 4,684,086 | 8/1987 | Fetsch ................................. 248/68.1 |
| 4,736,921 | 4/1988 | Zane et al. . |

(List continued on next page.)

FOREIGN PATENT DOCUMENTS

WO 97/31416 8/1997 WIPO .

OTHER PUBLICATIONS 5 sheets illustrating Hellermann CL8–SB8, and CL8–SB10 products and Behringer cable clamp, commercially available in the United States prior to Feb. 21, 1996.

*Primary Examiner*—Ramon O. Ramirez
*Attorney, Agent, or Firm*—Watts, Hoffmann, Fisher & Heinke Co., L.P.A.

[57] ABSTRACT

A clamp having two like members for securing service lines and cables to the frame of a motor vehicle. Service lines are secured between the members. The members are fixed together by a nut and bolt with each held in an associated member recess by an associated tension tab. The tension tabs permit any nut and bolt within a range of sizes to be used. At least one of the members has an external saddle formed in a surface which is an external surface when the clamp is in use. The saddle is used to carry additional service lines held in place by a self sizing tie.

18 Claims, 3 Drawing Sheets

U.S. PATENT DOCUMENTS

| | | | |
|---|---|---|---|
| 4,775,121 | 10/1988 | Carty | 248/68.1 |
| 4,878,696 | 11/1989 | Walker . | |
| 4,881,705 | 11/1989 | Kraus | 248/74.2 |
| 5,115,542 | 5/1992 | Gehres . | |
| 5,172,877 | 12/1992 | Hattori et al. | 248/68.1 |
| 5,205,520 | 4/1993 | Walker | 248/74.1 |
| 5,209,440 | 5/1993 | Walker | 248/68.1 |
| 5,234,185 | 8/1993 | Hoffman et al. | 248/56 |
| 5,271,588 | 12/1993 | Doyle | 248/68.1 |
| 5,377,441 | 1/1995 | Noda . | |
| 5,377,939 | 1/1995 | Kirma | 248/68.1 |
| 5,389,082 | 2/1995 | Baugues et al. . | |
| 5,435,506 | 7/1995 | Wiley | 248/68.1 |
| 5,458,303 | 10/1995 | Ruckwardt | 248/74.2 |
| 5,547,152 | 8/1996 | Krock | 248/74.1 |
| 5,598,994 | 2/1997 | Olewinski et al. | 411/431 X |
| 5,669,590 | 9/1997 | Przewodek | 248/68.1 |
| 5,730,399 | 3/1998 | Baginski | 248/68.1 X |
| 5,794,897 | 8/1998 | Jobin et al. | 248/68.1 X |

SERVICE LINE CLAMP WITH CABLE TIE MOUNT

The present invention relates generally to the field of service line supports. More particularly, the present invention relates to the field of mounting supports for service lines especially adapted for use in over-the-highway trucks and tractors.

BACKGROUND OF THE INVENTION

A variety of mounting supports are known for securing service lines to frame rails of motor vehicles, including over-the-highway trucks and tractors.

A prevalent need in clamping apparatus art is for a clamping apparatus that may be readily assembled and disassembled especially in applications with limited access to the clamping apparatus. There is also a need for a clamping apparatus which can be installed with a minimum amount of tools, effort and difficulty.

It is well known to provide a clamp composed of two clamping elements for holding service lines therebetween and a fastening device for coupling these elements together to provide a rigid clamp. This fastening device is conventionally a screw having a large head resting on the outside of one of the clamping elements and received in a threaded bore in the other clamping element, the two holding bodies having apertures centered in the holding bodies for placement of the screw.

One of the drawbacks of the prior art is the difficulty of use associated with tightening of the screw since the adjacent element tends to rotate with the screw head. To avoid this rotation the clamping element must be held against rotation while the service line and the clamping elements are held in their desired relative positions. This drawback requires additional effort, time and the use of both hands which use requires accessibility of the clamping unit for both hands.

SUMMARY OF THE INVENTION

With the clamp of the present invention, the described problems of the prior art and others are overcome and an enhanced application and ease of installment is achieved. This achievement is attained through the employment of a clamp for mounting one or more service lines to a support structure. The clamp has a pair of service line locating members each having at least one service line engaging surface. The surfaces are complemental in use and retain engagement with a service line when the members are secured together in facing relationship. The members are connected to releaseably couple the members together with a nut and bolt. Ease of assembly is facilitated by recessed nut or bolt head cavities located symmetrically of each member centerline.

At least one of the recessed cavities has a tensioning surface tab. This tab interferes with the bolt head or nut and holding the bolt head or nut in place to allow a minimum of effort to assemble the clamp. The tensioning surface tab is deformable to accommodate nuts and bolts of different sizes.

At least one of the members has, and in the preferred embodiment both members have, an external saddle formed on a surface which is external when the clamp is in use. These saddles provide an ability to carry additional service lines using self-sizing cable ties. The saddles are be positioned to enable additional bundles of service lines to be mounted on the external surface of either or both of the members.

In the preferred embodiment, the members are each formed from a high strength fiber filled nylon material which is an electric insulator. Each member may also utilize at least one insert positioned within its service line engaging surface for accommodating smaller lines. The inserts provide the ability to accommodate a variety of sizes and types of services lines.

In the preferred embodiment, the clamping device eliminates the tendency for relative member rotation during installation through at least one alignment pin and at least one coaching alignment pin receiving receptacle. The alignment pin on one member aligns with the receptacle on the other member to prevent the clamp members from rotating relatively during assembly and during tightening of the fastener. This allows the installation and removal of the device without the need to hold the members against relative rotation.

Additional advantages of the present invention will be apparent in the following detailed description, which, when taken in conjunction with the attached drawings discloses a preferred embodiment of this present invention.

IN THE DRAWINGS

It should be remembered that the members are identical and any reference herein to a first, or second member is equally applicable to the other member.

DETAILED DESCRIPTION OF THE PREFERRED EMBODIMENT

I. The Overall Clamp

Figure 9:
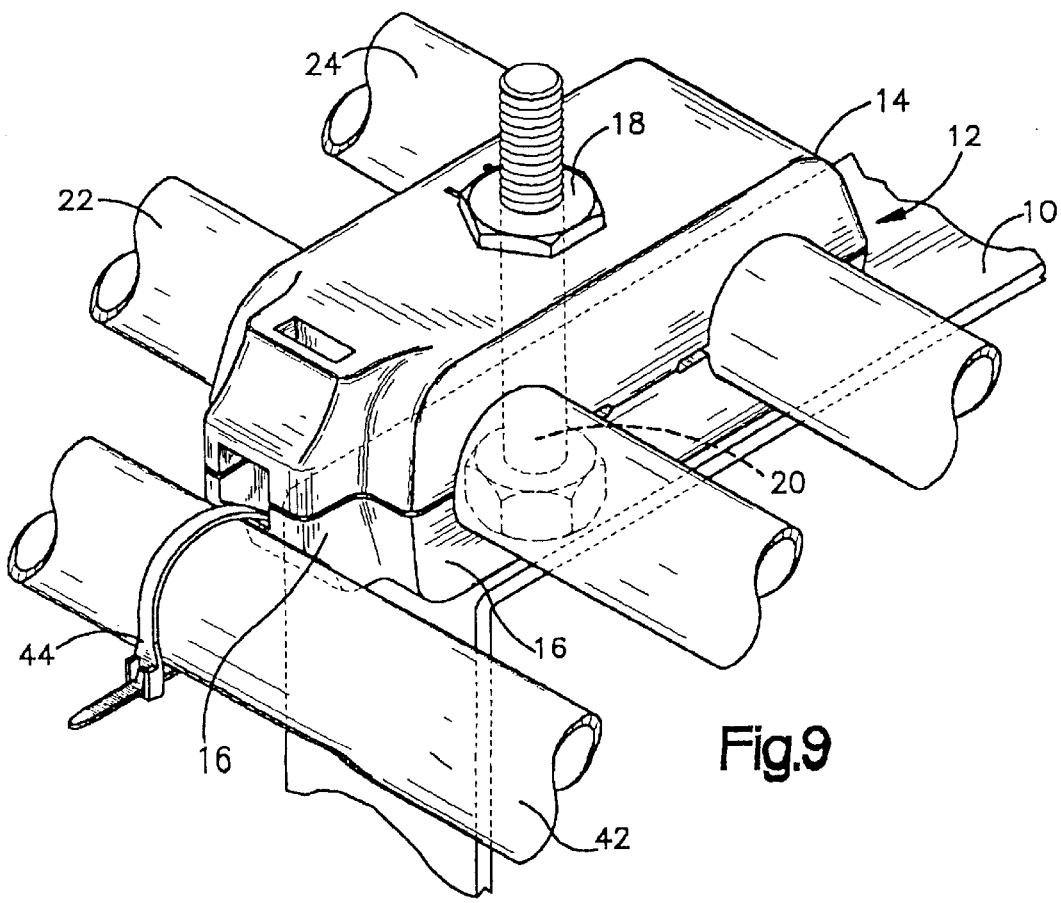

FIG. 9 illustrates a motor vehicle frame element 10 having a fully installed clamp assembly 12. The clamp assembly 12 includes first and second identical members 14,16. The first member 14 of the clamp assembly 12 is directly connected to the frame element 10. The second member 16 is coupled to the first member 14, by a nut 18 and bolt 20. Motor vehicle service lines 22, 24 are held in place by the clamp assembly 12. The clamp assembly 12 may advantageously be used to mount any suitable service line 22,24 to any suitable support structure.

Figure 1:
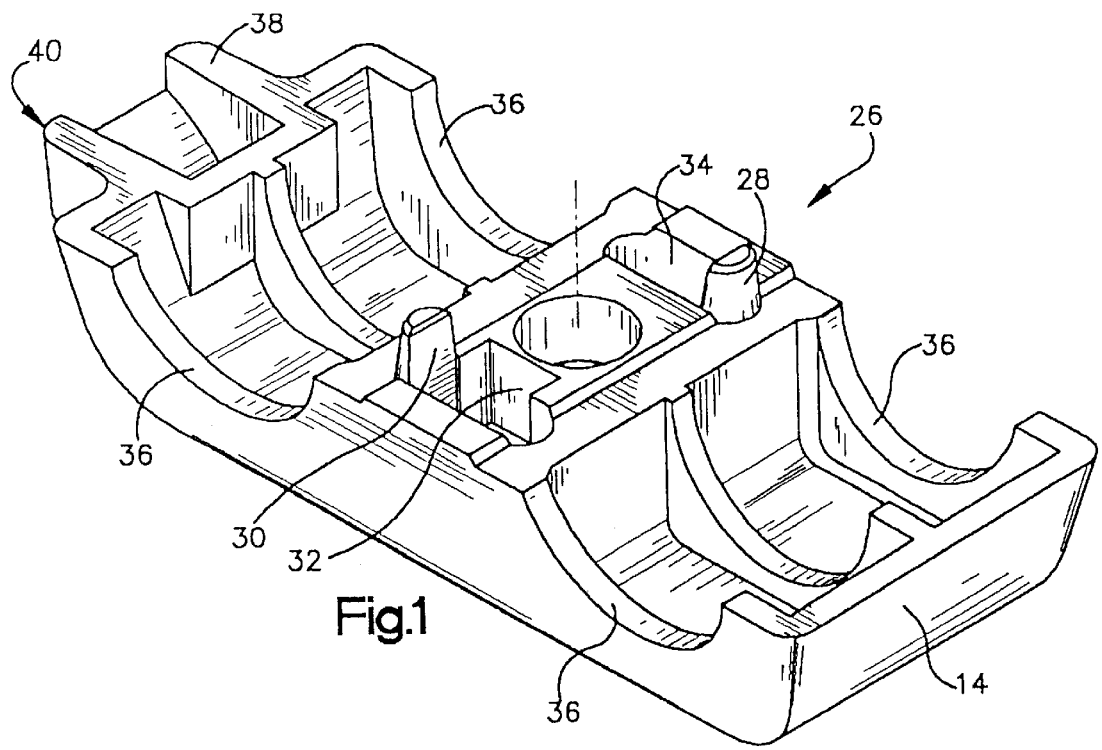
FIG. 1 is a perspective view of the internal portion of one of the members showing internal service line receiving recesses.

FIG. 1 illustrates an internal surface 26 of the first member 14. A pair of alignment pins 28,30 and alignment recesses 32,34 are also seen in FIG. 1. Engaging surfaces 36 hold the service lines 22,24 in place. An underside 38 of a saddle 40 for attaching additional services lines 42 with a self-adjusting cable tie 44 (FIG. 9) is also shown.

Figure 2:
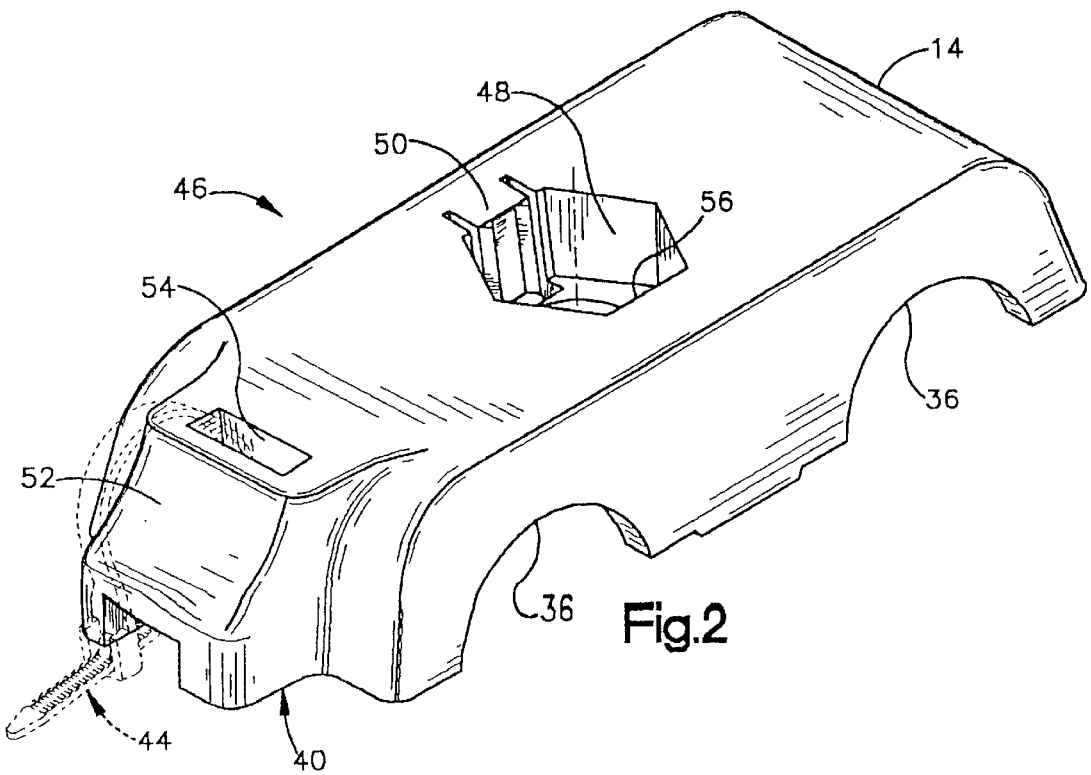
FIG. 2 is a perspective view of one of the members depicting the external face.

FIG. 2 illustrates an external surface 46 of the first member 14. Also shown on the external surface 46 are a nut or bolt accommodating cavity 48. Visible in FIG. 2 in the accommodating cavity 48 is a tensioning tab 50 that projects into the cavity 48 to hold the nut 18 or head of the bolt 20 in place during tightening or loosening. FIG. 2 also shows an external surface 52 of the saddle 40 and a through slot 54 for receiving and retaining a self-adjusting tie 44 that holds one or more additional service lines 42 in place.

Figure 3:
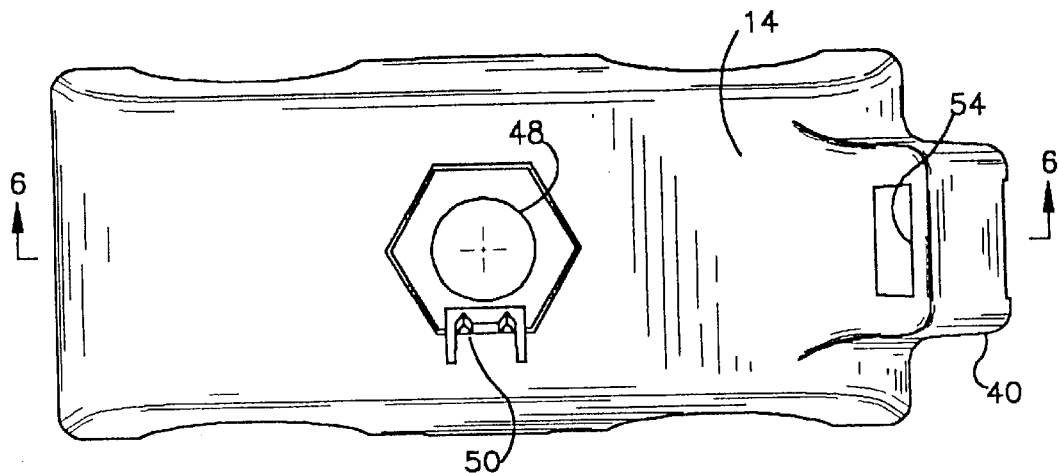
FIG. 3 is a plan view of the external surface of one of the members showing the saddle and the tensioning surface tab.

FIG. 3 is a plan view of an external surface 46 of the first member 14 showing the flexible, tensioning tab 50. The tab 50 extends into a recess 48 to enable a range of sizes of nuts and bolts to be held in place in the recess 48. Thus the tensioning tab facilitates tightening and loosening of fasteners since there is no need to manually hold the nut or bolt head in the recess.

Figure 8:
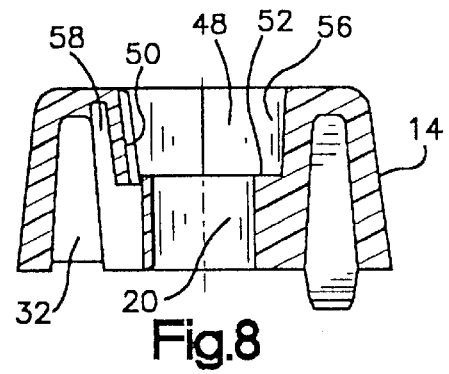
FIG. 8 is a cross sectional view of one of the members as seen from the plane indicated by the line 8—8 of FIG. 4; and, FIG. 9 is a perspective view of the clamp fully installed on a frame with two service lines being held in place and with an unused saddle.

As is best seen in FIG. 8, the tensioning tab 50 extends from the top of the recess 48 to a location below recess base 52. The member includes a space 58 behind the tab 50 such that bolts and nut heads for a range of sizes can be accommodated in the recess 48. The tab biases a nut or bolt head against an opposite section 56 of a hexagonal perimetral wall defining the recess 48. One major advantage of this tab is that metric fasteners may be substituted for English standard and visa versa without sacrificing the fastener retaining features of the clamp. Thus, even if all six walls of the hexagonal space, the tab being one of them, are not engaged, there will be sufficient wall engagement to retain a fastener in the recess 48 while relative rotation of the fastener and its associated member are prevented.

Figure 4:
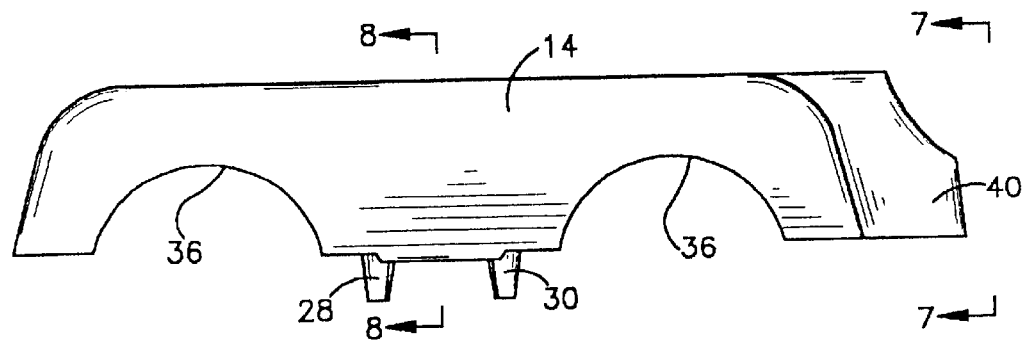
FIG. 4 is a side elevational view of one of the members.
Figure 5:
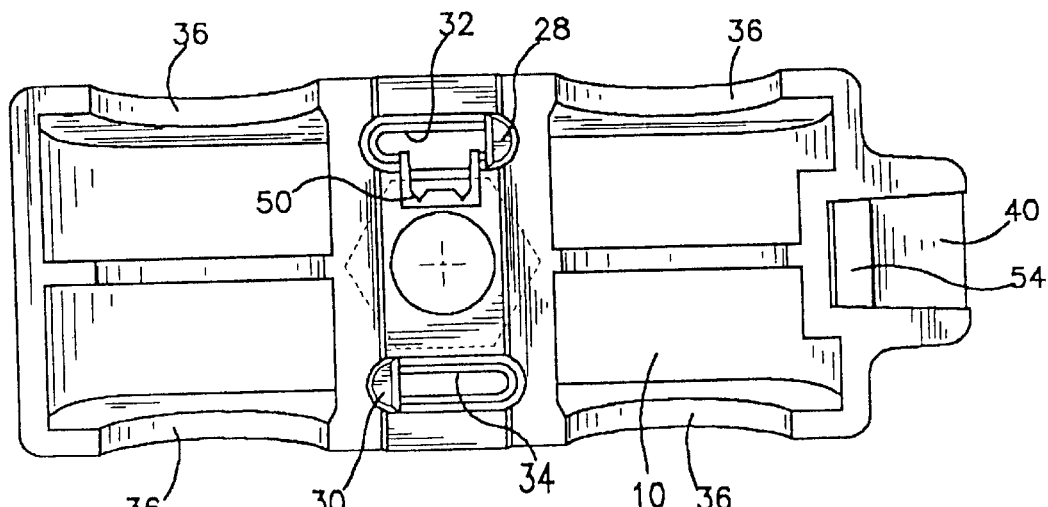
FIG. 5 is a plan view of the internal face of one of the members.
Figure 6:
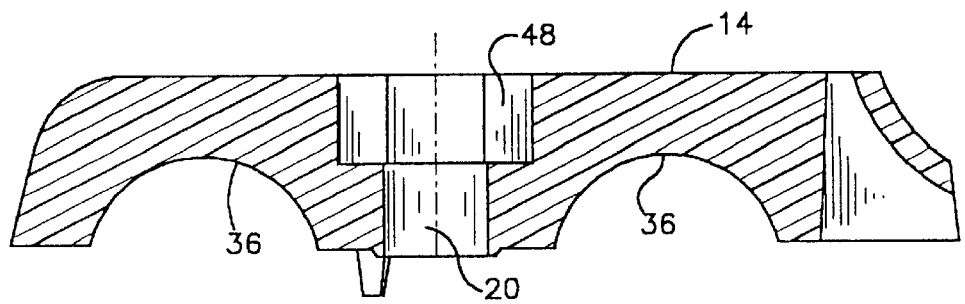
FIG. 6 is a sectional view of one of the members as seen from the plane indicated by the line 6—6 of FIG. 3.
Figure 7:
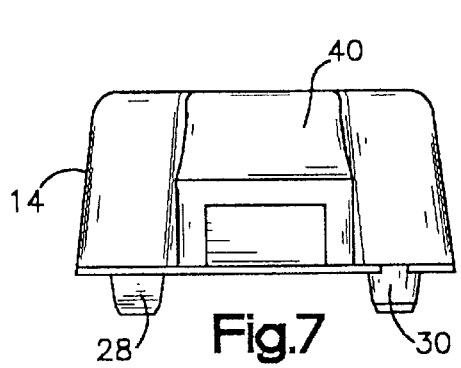
FIG. 7 is a end elevational view of one of the members as seen from the plane indicated by the line 7—7 of FIG. 4.

An examination of FIGS. 4 and 5 shows the projection of the alignment pins 28,30 for coaction with the recesses 32,34 of the members 14,16 to prevent relative member rotations, a result of the torque applied when tightening the nut 18 and bolt 20.

Operation

In operation a selected one of a nut or bolt is positioned in a recess 48 of one of the members. Referring to FIG. 9, the nut 18 has been positioned in the recess 48 of the member 14 and retained there by the tab 50. Next the members 14,16 are brought together with the alignment pins 28,30 of each of the members projecting into the apertures 32,34 of the opposite member. The service lines 22,24 are trapped between the members and in retentive engagement with the surfaces 36. Next a bolt is passed through an aperture, not shown, in the frame element 10 and rotated to threadedly engage the nut 18 and secure the entire assembly in position.

It will be seen that the operator needs but one hand to hold the clamp assembly and service lines in position, while with the operator's other hand the bolt 20 is passed through an aperture in the frame 10 and threaded into the nut 18 and thereafter tightened to secure the entire assembly against the frame. It will be recognized that the frame functions to keep the bolt head out of the recess 48 of the member 16. For other applications, such as when service lines are merely being clamped to maintain their relative positions, a washer will be required.

Although the invention has been described in its preferred form with a certain degree of particularity, it is understood that the present detailed disclosure is made only by way of example and that numerous changes in the details of construction, operation and the combination and arrangement of parts may be made without departing from the spirit or scope of the invention as hereinafter claimed.

What is claimed is:

1. A clamp for mounting a service line to a support structure, the clamp comprising:

a) a pair of service line locating members each having at least one service line engaging surface;

b) the surfaces being in a complemental position for retaining engagement with a service line when the members are secured together in facing relationship and the clamp is in use;

c) at least one of the members including an external saddle formed in another surface which is an external surface when the clamp is in use, the saddle being contoured for surface engagement with an additional service line said one member also including a slot for receiving and engaging a self-sizing cable tie to retain such an additional service line against the saddle; and d) a connector to releaseably couple said members together.

2. The clamp of claim 1, wherein said connector includes a nut and bolt.

3. The clamp of claim 1, wherein each of said members are formed from a material which is an electric insulator.

4. The clamp of claim 3, wherein said material is a high strength fiber filled nylon.

5. The clamp of claim 1, wherein each of the service line engaging surfaces includes at least one alignment pin and at least one alignment pin receiving receptacle such that each said at least one alignment pin of one member aligns one said at least one receptacle on the other member to prevent the clamp from twisting during assembly and use whereby to allow tightening of the connectors without holding either member against relative rotation of the members.

6. The clamp of claim 1, wherein each of the members includes a saddle adapted to be positionable to enable a plurality of additional service lines to be mounted on the external surface of each of the members.

7. The clamp of claim 1, wherein each of the members has a recessed nut or bolt head cavity formed in the external surface of the first member.

8. The clamp of claim 7, wherein the tensioning surface tab is adapted to be deformable to accommodate nuts and bolts of a range of sizes.

9. The clamp of claim 8, wherein at least one of the recessed cavities has a tensioning surface tab for interference with such bolt head or nut positioned in such one cavity to hold such bolt head or nut in said one cavity to facilitate assembly of clamp.

10. A clamp member for use with a like member to secure a service line in place, the member comprising:

a) a molded body having a line engaging surface for coaction with a like surface to retain a service line in a selected position;

b) the body including a through fastener bore;

c) the body also including a fastener receiving recess in an external surface in axial communicating alignment with the bore, the recess being defined in part by a plurality of generally flat fastener engagement surfaces for rotation preventing engagement with a fastener element; and, d) the member including a flexible tensioning tab projecting into the fastener recess for retaining engagement with such fastener element when such element is in the recess.

11. The fastener of claim 10, wherein the flat fastener engagement surfaces define a hexagonal fastener recesses.

12. The fastener of claim 11, wherein the outer surfaces each include a saddle for engagement with a further service line and the members each include a through slot for receipt of a flexible strap to maintain such further line in engagement with the saddle.

13. For use in anchoring service lines in preselected positions, an improved service line clamp comprising:
   a) a pair of like members of molded electrically insulating material;
   b) each of the members including:
      i) a through bore extending from an outer surface to a facing surface;
      ii) the facing surface including spaced line engaging recesses disposed symmetrically on opposite sides of an imaginary transverse plane including an axis of said bore;
      iii) the facing surface also including a pair of locating recesses and a pair of locating projections for coacting receipt in locating recesses of a like member;
      iv) the outer surface including a fastener receiving recess in axially aligned communication with the bore, the fastener recess being defined in part by a perimetral wall including a plurality of flat fastener engaging surfaces; and,
      v) a flexible fastener engaging element projecting into the fastener recess for retentive engagement of a fastener;
   c) a bolt extending through the bores of the like members with the facing surfaces being in confronting relationship and the locating projections of one of the members disposed in the locating recesses of the other of the members and visa versa;
   d) a nut threaded onto the bolt; and,
   e) a selected one of a head of the bolt and the nut being disposed when in use in one of the fastener recesses with surfaces of the selected one biased by the flexible element against at least two said flat surfaces; and,
   f) the unselected one of the bolt head and nut being spaced from the other of the fastener recesses when in use by an apertured member disposed around a shank of the bolt.

14. The fastener of claim 13, wherein the flat surfaces define a hexagonal fastener recesses.

15. The fastener of claim 13, wherein the outer surfaces each include a saddle for engagement with a further service line and the members each include a through slot for receipt of a flexible strap to maintain such further line in engagement with the saddle.

16. For use in anchoring service lines in preselected positions, an improved service line clamp component comprising:
   a) a molded member of electrically insulating material;
   b) the member including:
      i) a through bore extending from an outer surface to a facing surface;
      ii) the facing surface including spaced line engaging recesses disposed symmetrically on opposite sides of an imaginary transverse plane including an axis of said bore;
      iii) the facing surface also including a pair of locating recesses and a pair of locating projections for coacting receipt in locating recesses of a like member;
      iv) the outer surface including a fastener receiving recess in axially aligned communication with the bore, the fastener recess being defined in part by a perimetral wall including a plurality of flat fastener engaging surfaces; and,
      v) a flexible fastener engaging element projecting into the fastener recess for retentive engagement of a a selected one of a bolt head and a nut.

17. The component of claim 16, wherein the flat surfaces define a hexagonal fastener recess.

18. The component of claim 17, wherein the outer surface includes a saddle for engagement with a further service line and the member includes a through slot for receipt of a flexible strap to maintain such further line in engagement with the saddle.

* * * * *